July 21, 1936.  W. G. G. GODRON  2,048,258
PISTON RING
Filed Dec. 19, 1934
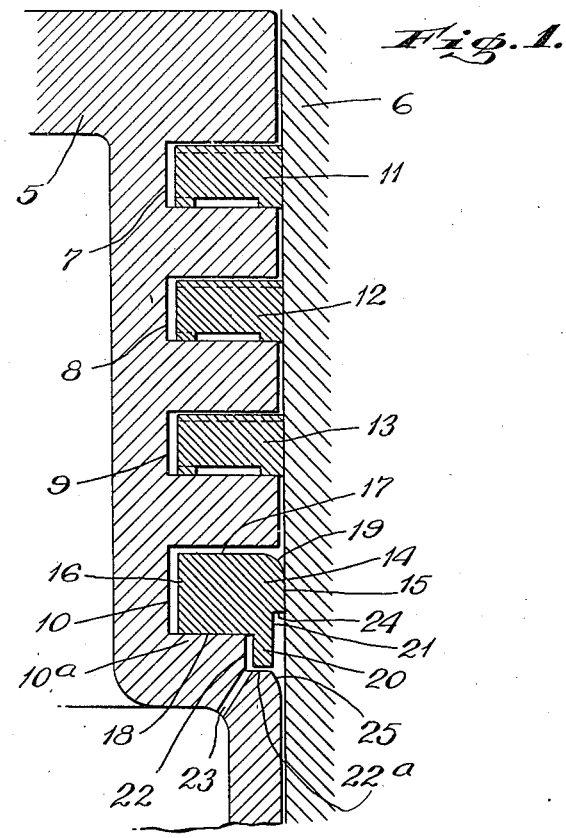
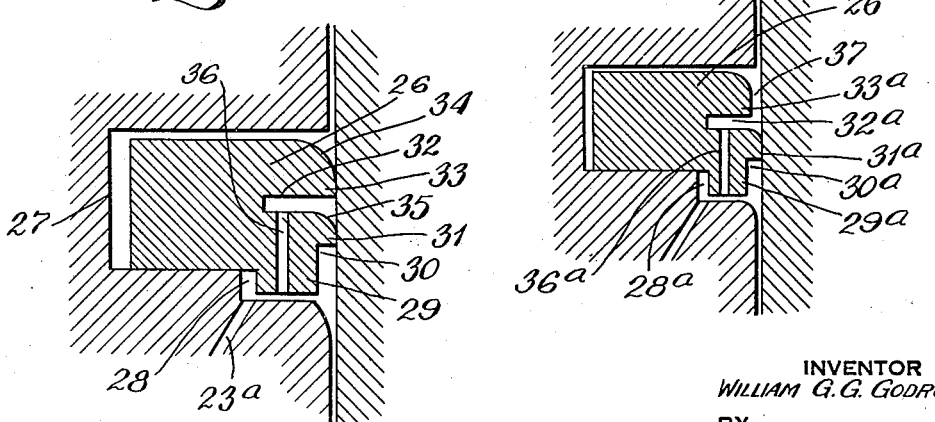
INVENTOR
WILLIAM G. G. GODRON
BY
Howard E. Thompson
ATTORNEY Patented July 21, 1936

2,048,258

UNITED STATES PATENT OFFICE 2,048,258

PISTON RING

William G. G. Godron, New York, N. Y.

Application December 19, 1934, Serial No. 758,159

5 Claims. (Cl. 309—7)

This invention relates to piston rings or devices of this class for use in connection with reciprocating members of various kinds and classes; and the object of the invention is to provide a ring, commonly termed a wiper ring, which is so constructed as to more efficiently control and regulate the application of a lubricant to the walls of a cylinder and to a piston operating in the cylinder, and especially to eliminate the feeding of excessive lubrication to the cylinder wall as well as to eliminate the disadvantages occasioned by such excessive oil feed; a further object being to provide a wiper ring with a circumferential groove formed in the outer or front surface thereof to form a pocket in which lubricating oil may be gathered in the process of wiping the cylinder; a further object being to provide the lower side surface of the ring with a downwardly projecting annular flange or wall disposed adjacent the outer or front surface of the ring and forming a guard wall or baffle preventing, to a large degree, the passage of the lubricant onto the lower side surface of the ring inwardly of said flange; a further object being to provide the piston or supporting body of the ring with a groove for receiving said flange so that when the lower side surface of the ring proper seats upon the adjacent wall of the ring groove, the lower edge of said flange will be free from the adjacent wall of said groove, and also whereby the inner surface of said flange will be disposed in spaced relation to the adjacent wall of the groove; a further object being to provide the front or outer surface of the ring with a circumferential groove intermediate the side surfaces thereof, the ring having ports or passages for placing said last named groove in communication with the groove of the piston for receiving said flange; and with these and other objects in view, the invention consists in a ring device of the class and for the purpose specified, which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:

Fig. 1 is a sectional view through one side of a piston showing a number of ring grooves and rings therein, and illustrating one of my improved wiper rings.

Fig. 2 is a view similar to Fig. 1 showing only a part of the construction and showing a modification; and, Fig. 3 is a view similar to Fig. 2 showing another modification.

For the purpose of illustrating one use of my invention, I have indicated at 5 in Fig. 1 of the drawing part of a piston or other reciprocating member; at 6 the cylinder wall; and at 7, 8, 9 and 10 a plurality of ring grooves. In the grooves 7, 8 and 9 are arranged rings 11, 12 and 13 which may be of any desired form and construction.

At 14, I have shown one form of my improved wiper ring having a front surface 15, a rear surface 16, an upper side surface 17 and a lower side surface 18. The upper front corner of the ring is beveled or rounded as seen at 19 to provide for the passage of lubricating oil from the cylinder wall downwardly past the front surface of the ring in the upward stroke of the piston 5. The lower side surface 18 of the ring is provided with a downwardly projecting annular flange or wall 20 which is disposed adjacent the front surface of the ring, said front surface being reduced adjacent the lower surface to form an annular groove or recess 21 which extends over the outer or front surface of the flange 20. The ring groove 10 extends at the lower side thereof into a supplemental shallow groove 22 in which the annular flange or wall 20 is positioned so that when the lower side surface 18 of the ring 14 seats on the adjacent wall 10a of the ring groove, the lower surface of the flange 20 is spaced from the adjacent wall 22a of the groove 22 in order to prevent any splash of oil by interengagement of the last named surfaces. It is also preferred that a discharge port or passage 23 be employed which extends from the groove 22 into the piston so that any oil that may collect in the bottom of the groove 22 will pass into the piston; it being understood that a number of the passages 23 will be employed circumferentially of the piston.

The groove 21 forms a relatively sharp wiper edge 24 so that in the downward stroke of the piston, this edge will serve to remove the major part of the oil from the cylinder, leaving just a slight oil film, and the oil so removed will collect in the recess 21 as well as the bottom of the recess 22 and pass into the piston through the ports 23. The outer corner of the piston 5 adjacent the groove 22 is beveled or rounded as indicated at 25 so as to permit any excess oil that may remain in the groove 21 to pass over the piston in the upward stroke thereof.

In Fig. 2 of the drawing, I have shown a modified form of wiper ring 26 disposed in the ring groove 27 as well as a shallow groove 28 similar to the groove 22, the ring 26 having a depending flange or wall portion 29 similar to the flange 20 which extends into the groove 28, and this wall portion is disposed inwardly but adjacent the outer or front surface of the ring so as to form an annular groove 30 similar to the groove 21, and a scraping edge or shoulder 31 similar to the edge 24.

The ring 26 in the construction shown in Fig. 2 includes an additional annular groove 32 formed in the outer or front surface of the ring to provide another scraper shoulder or edge 33 immediately above the shoulder 31.

The upper outer corner of the ring is beveled or rounded as seen at 34, as is also the upper corner of the shoulder 31 as seen at 35, both rounded corners facilitating the free passage of lubricating oil past the ring in the upward stroke thereof, whereas the two wiper shoulders serve to remove the film of oil in the downward stroke of the piston to collect the oil in the groove 30 as well as in the annular groove or recess 32. The oil collected in the recess 32 may extend into the groove 28 through a series of circumferentially spaced ports or passages 36 which open into the groove 28, and this oil as well as the oil collected in the grooves 30 and 28 can pass into the piston through ports 23a similar to the ports 23.

In Fig. 3 of the drawing, I have shown another form of wiper ring designated as 26a, and this ring is in all respects similar to the ring 26 with the exception that the shoulder 33a is set inwardly and does not act as or constitute a wiper shoulder in the sense of the shoulder but merely serves to form an admission passage 37 between the outer surface of the ring 26a and the cylinder wall so that lubricating oil can enter the groove or recess 32a and pass into the groove 28a through the ports 36a. The ring 26a includes the downwardly extending wall or flange 29a, the groove 30a and the shoulder 31a, similar to the ring shown in Fig. 2.

In wiper rings as well as other rings commonly employed in connection with pistons or reciprocating members, it has been the common experience that in the downward stroke of the piston, the oil on the cylinder wall would pass into the ring grooves beneath the lower side surfaces of the rings and adjacent sides of the ring grooves by reason of the fact that the rings are in engagement with the upper surfaces of the grooves, and in the downward stroke of the piston, the lower surfaces of the rings are forced into engagement with the bottom wall of the ring grooves, thus acting as a pump to discharge a large quantity of the oil in the ring grooves into the cylinder over the top surfaces of the rings. As the piston continues to reciprocate upwardly and downwardly in the cylinder, this pumping action continues until a surplus of oil prevails within the cylinder above the piston which tends to build up and cause excessive carbonization.

The principal object of my invention is to provide the reciprocating member with one or more wiper rings or rings of the structure herein described, with beveled flanges or walls and with a method of wiping which will operate to collect the oil in a groove formed below the ring or within the boundaries of the ring and transmit it to a groove disposed below the normal bottom wall of the ring groove so that the possibility of getting an excessive amount of oil into the ring groove and the pumping of oil into the cylinder above the rings is eliminated to a large degree, if not entirely.

In other words, if no excessive amount of oil is permitted to gather on the bottom wall of the ring groove, for example, the wall 10a in Fig. 1, in the downward stroke of the piston, then in the upward stroke of the piston, there will be no oil to be pumped or forced into the cylinder above the ring when the lower surface 18 of the ring 14 strikes said bottom wall 10a. In the upward stroke of the piston, the light film of oil which would then prevail on the cylinder wall is free to pass over the outer surface 15 of the ring by virtue of the beveled or rounded upper corner 19 of the wiper ring 14 which encourages this action. Furthermore, the beveled wall 25 on the piston will permit any oil that may have previously been gathered in the groove 21 to pass over the outer surface of the piston in its upward stroke.

With my improved wiper ring and in the use of one or more of such rings, depending upon the design and function of the apparatus in connection with which the same is employed, proper or effective lubrication can be provided for the reciprocating member without experiencing excessive lubrication and the detrimental effect of excessive lubrication, especially in internal combustion engines, which tends to form carbon deposits upon the top of the piston as well as on other surfaces such for example as on the cylinder and on the rings and in the grooves in which the rings are mounted. By eliminating the carbon formation, a more successful engine operation is provided as well as a longer life to the working parts.

It will be understood that the rings 14, 26, 26a may be of the conventional split type, or in other words, spring rings or of any other desired structural arrangement, and while I have shown certain forms of wiper rings and have indicated certain uses thereof, my invention is not necessarily limited in these respects, and various changes in and modifications of the construction herein shown and described may be made within the scope of the appended claims without departing from the spirit of my invention or sacrificing its advantages.

It will be apparent that the flange 20 in conjunction with the groove 28—28a, forms what might be termed "oil traps", into which oil removed from the surface of the cylinder by the respective rings will pass, and this oil will be returned back to the crank case through the passages 23, 23a employed.

Having fully described my invention, what I claim as new and desire to secure by Letters Patent, is:

1. A ring of the class described having a front surface, a back surface and side surfaces, a projecting annular flange extending beyond one side surface of the ring adjacent the front surface thereof, the outer or front surface of said flange being set inwardly with respect to the front surface of the ring to provide an annular recess, an annular wiper shoulder having a relatively sharp corner at the outer surface of the ring, the opposed side surface of the ring joining said front surface in a beveled corner, the front surface of the ring having a deep annular groove intermediate the side surfaces thereof, a plurality of passages communicating with said last named groove and opening outwardly through said flange inwardly of the outer surface thereof, and the front surface of the ring above the second named annular groove being set inwardly.

2. A wiper ring for reciprocating members comprising a ring body having front, back and side surfaces, one side surface of the ring having a projecting annular flange disposed adjacent the front surface, the front surface of said flange and the adjacent front surface of the ring proper being set inwardly to form a circumferential groove terminating in a shoulder portion at the front surface of the ring above the lower side surface of the ring proper, the upper side surface of the ring joining the front surface thereof in a rounded corner portion, the front surface of the ring being provided with a deep circumferential groove intermediate said shoulder and the last named side surface of the ring, circumferentially spaced passages formed in the flange portion of the ring and opening through the lower surface of the flange and into said last named groove, and the lower surface of the last named groove joining the front surface of the ring in a beveled corner portion.

3. A wiper ring for reciprocating members comprising a ring body having front, back and side surfaces, one side surface of the ring having a projecting annular flange disposed adjacent the front surface, the front surface of said flange and the adjacent front surface of the ring proper being set inwardly to form a circumferential groove terminating in a shoulder portion at the front surface of the ring above the lower side surface of the ring proper, the upper side surface of the ring joining the front surface thereof in a rounded corner portion, the front surface of the ring being provided with a deep circumferential groove intermediate said shoulder and the last named side surface of the ring, circumferentially spaced passages formed in the flange portion of the ring and opening through the lower surface of the flange and into said last named groove, the lower surface of the last named groove joining the front surface of the ring in a beveled corner portion, and the front surface of the ring intermediate the last named groove and the second named side surface thereof being set inwardly.

4. In a reciprocating member having a ring groove with a supplemental shallow groove at the outer surface of said member and at one side of the first named groove, a ring having front, back and side surfaces, a projecting annular flange extending beyond the lower side surface of the ring adjacent the front surface thereof and adapted to enter said supplemental groove, the outer or front surface of said flange being set inwardly with respect to the front surface of the ring to provide an annular recess, and an annular wiper shoulder having a relatively sharp corner at the outer surface of the ring, said shoulder being arranged at a point well above the lower side surface of the ring whereby said recess is of greater vertical dimensions than the corresponding dimensions of said flange to provide a relatively large oil collecting chamber opening into the supplemental groove of said reciprocating member, the outer corner portion of said member adjacent the supplemental groove being rounded to permit the free passage of lubricant downwardly over the surface of the reciprocating member below the supplemental groove and the recess in the surface of said ring, and the reciprocating member having a plurality of circumferentially spaced passages opening into the supplemental groove at the inner end thereof.

5. In a reciprocating member having a ring groove with a supplemental shallow groove at the outer surface of said member and at one side of the first named groove, a ring having front, back and side surfaces, a projecting annular flange extending beyond the lower side surface of the ring adjacent the front surface thereof and adapted to enter said supplemental groove, the outer or front surface of said flange being set inwardly with respect to the front surface of the ring to provide an annular recess, an annular wiper shoulder having a relatively sharp corner at the outer surface of the ring, said shoulder being arranged at a point well above the lower side surface of the ring whereby said recess is of greater vertical dimensions than the corresponding dimensions of said flange to provide a relatively large oil collecting chamber opening into the supplemental groove of said reciprocating member, the outer corner portion of said member adjacent the supplemental groove being rounded to permit the free passage of lubricant downwardly over the surface of the reciprocating member below the supplemental groove and the recess in the surface of said ring, the reciprocating member having a plurality of circumferentially spaced passages opening into the supplemental groove at the inner end thereof, the front surface of the ring having an annular groove intermediate the side surfaces thereof, and a plurality of circumferential passages for placing said last named groove in communication with the supplemental groove of said reciprocating member.

WILLIAM G. G. GODRON.